(12) United States Patent
Lim et al.

(10) Patent No.: US 10,675,937 B2
(45) Date of Patent: Jun. 9, 2020

(54) SPRING FORCE ACTING AXIS CONTROLLABLE ACTIVE SUSPENSION SYSTEM

(71) Applicant: DAEWON KANG UP CO., LTD., Cheonan-si, Chungcheongnam-do (KR)

(72) Inventors: Manseung Lim, Suwon-si (KR); Jinyong Park, Seoul (KR); Sangeun Bae, Seoul (KR)

(73) Assignee: DAEWON KANG UP CO., LTD (KR)

( * ) Notice: Subject to any disclaimer, the term of this patent is extended or adjusted under 35 U.S.C. 154(b) by 0 days.

(21) Appl. No.: 15/580,956

(22) PCT Filed: Mar. 28, 2016

(86) PCT No.: PCT/KR2016/003138
§ 371 (c)(1),
(2) Date: Dec. 8, 2017

(87) PCT Pub. No.: WO2016/200029
PCT Pub. Date: Dec. 15, 2016

(65) Prior Publication Data
US 2018/0178611 A1 Jun. 28, 2018

(30) Foreign Application Priority Data

Jun. 10, 2015 (KR) .................. 10-2015-0081770

(51) Int. Cl.
*B60G 17/02* (2006.01)
(52) U.S. Cl.
CPC ...... *B60G 17/021* (2013.01); *B60G 2200/144* (2013.01); *B60G 2200/156* (2013.01);
(Continued)

(58) Field of Classification Search
CPC .... B60G 17/021; B60G 17/02; B60G 17/015; B60G 2204/1244; B60G 2200/144;
(Continued)

(56) References Cited

U.S. PATENT DOCUMENTS

2009/0261542 A1* 10/2009 McIntyre ............. B60G 17/021
280/6.157
2010/0187787 A1* 7/2010 Freund ................. B60G 17/021
280/124.101

FOREIGN PATENT DOCUMENTS

JP       2008247184 A    10/2008
KR    20060053711 A    5/2006
(Continued)

OTHER PUBLICATIONS

International Search Report dated Sep. 7, 2016; International Application No. PCT/KR2016/003138 filed on Mar. 28, 2016.
(Continued)

*Primary Examiner* — Darlene P Condra
(74) *Attorney, Agent, or Firm* — McDonald Hopkins LLC

(57) ABSTRACT

The present invention relates to an active suspension system allowing the force acting axis of a spring to be controlled, wherein a control means for the force acting axis of a spring is installed either between an upper seat plate and an upper arm, or between a lower seat plate and a lower arm so as to allow the wheel rate and vehicle height to be controlled by varying the force acting axis of the coil spring, and a manipulation unit capable of controlling the operation of the control means for the force acting axis of a spring is installed inside the vehicle. By varying the force acting axis of the coil spring, the present invention can significantly improve the marketability of the suspension system and reliability of the vehicle by varying the ride quality.

2 Claims, 4 Drawing Sheets

(52) U.S. Cl.
 CPC ...... *B60G 2202/12* (2013.01); *B60G 2202/42* (2013.01); *B60G 2204/127* (2013.01); *B60G 2204/1244* (2013.01); *B60G 2204/4193* (2013.01); *B60G 2500/20* (2013.01); *B60G 2500/32* (2013.01)

(58) Field of Classification Search
 CPC ............ B60G 2202/12; B60G 2202/42; B60G 2500/32; B60G 2204/127; B60G 2200/156; B60G 2500/20; B60G 2204/4193; F16H 1/16
 See application file for complete search history.

(56) References Cited

FOREIGN PATENT DOCUMENTS

| | | |
|---|---|---|
| KR | 20080052760 A | 6/2008 |
| KR | 100921809 B1 | 10/2009 |
| KR | 20100038387 A | 4/2010 |
| KR | 20100048155 A | 5/2010 |

OTHER PUBLICATIONS

Korean Patent Office, Decision to Grant a Patent for Patent Application No. 10-2017-0046046, dated Nov. 21, 2017.
Korean Patent Office, Notice of Preliminary Rejection for Patent Application No. 10-2017-0046046, dated Aug. 16, 2017.

\* cited by examiner

SPRING FORCE ACTING AXIS CONTROLLABLE ACTIVE SUSPENSION SYSTEM

CROSS-REFERENCE TO RELATED APPLICATION

The present application claims priority to and the benefit of International Application No. PCT/KR2016/003138 filed on Mar. 28, 2016, which claims priority to and the benefit of Korean Patent Application No. 10-2015-0081770 filed on Jun. 10, 2015, each of which are incorporated herein by reference in their entirety.

TECHNICAL FIELD

The disclosure relates to an active suspension system capable of adjusting a force acting axis of a spring, and more particularly, to an active suspension system in which upper and lower control arms, a coil spring mounted therebetween, and upper and lower seat plates for connecting the components are not fixedly mounted, but are mounted such that the angles thereof can be adjusted in the lateral direction, thereby shifting a force acting axis of a symmetrical or asymmetrical coil spring from the center of the spring in the (+) or (−) lateral direction and consequently making it possible to adjust a wheel rate and a height of a vehicle depending on the circumstances.

BACKGROUND ART

In general, a suspension is a device for supporting a chassis of a vehicle, and is also referred to as a suspension system.

One type of a suspension comprises mainly a shock absorber, a spring, and a suspension arm, and main functions thereof are to prevent road shocks from being directly transferred to the chassis or passengers by absorbing the shocks and to securely bring tires into contact with the ground.

Therefore, the suspension has a great influence on passengers' riding comfort and drivability and stability of the vehicle.

Suspensions are classified into various types depending on the structure thereof. The most common suspension is a strut-type suspension. As other examples, there are a double-wishbone-type suspension and a multi-link-type suspension.

The suspension is typically configured to absorb shocks using a metal plate and a shock absorber. An 'electronically controlled suspension', in which shock absorbing characteristics of a shock absorber are electronically controlled, has been developed, and an 'electronically controlled air suspension', which uses an air instead of a metal plate, is also being used.

Further, there has been developed an 'active suspension', which employs a hydraulic system having excellent responsibility instead of a plate and a shock absorber and which controls vibration of the chassis appropriately for the traveling states of the vehicle using a computer, thereby ensuring traveling stability and drivability.

Suspensions may be classified into those suitable for a front wheel and those suitable for a rear wheel depending on the mounting position. Generally, a strut-type suspension is mounted to a front wheel, and a rigid axle suspension or an independent rear suspension (IRS) is mounted to a rear wheel.

One end portion of an upper arm is pivotably supported by the chassis and the opposite end portion thereof is pivotably supported by the upper portion of the wheel via an upper ball joint. One end portion of a lower arm is pivotably supported by the chassis and the opposite end portion thereof is pivotably supported by the lower portion of the wheel via a lower ball joint. A shock absorber and a coil spring are mounted between the bottom surface of the chassis and the top surface of the lower arm, and an upper seat plate and a lower seat plate are, respectively, mounted to the upper contact end and the lower contact end of the coil spring at the exterior of the shock absorber.

At this time, the upper and lower seat plates perform pivot motion about the respective center points thereof so as to adjust angles thereof, thereby making it possible to shift the force acting axis of the coil spring to the left or right from the center of the coil spring.

In the suspension system having the above-described configuration, when the force acting axis of the coil spring is shifted, the distance between the wheel and the load contact point of the coil spring varies, thereby making it possible to adjust a wheel rate and a height of the vehicle and consequently to change the riding comfort of the vehicle.

Here, the wheel rate is a suspension spring constant measured at the position of the wheel of the vehicle, and is also referred to as a suspension rate. The wheel rate is indicated by the weight that is required to make the center of the upper end of the coil spring and the center of the wheel come a unit distance (mm) closer to each other, excluding compression of the tire, attributable to a certain amount of load applied thereto.

Further, the coil spring constant measured at the position of the wheel including the tire is referred to as a 'ride rate'.

A conventional method for adjusting the wheel rate and the height of the vehicle by varying the force acting axis of the coil spring in the aforementioned suspension system is disclosed in Japanese Patent Registration No. 4369418 (Sep. 4, 2009) (Title: Wheel Suspension).

The wheel suspension disclosed in the Japanese Patent Registration No. 4369418 is configured such that, separately from a shock absorber detachably mounted between the bottom surface of the chassis and the top surface of a lower arm, a coil spring is mounted in another space formed between the bottom surface of an upper arm and the top surface of the lower arm, and such that a center line L and a force acting axis W of the coil spring are geometrically changed via rotation, thereby changing the rigidity of the coil spring.

However, in this configuration, because the coil spring is rotatably mounted between the bottom surface of the upper arm and the top surface of the lower arm separately from the shock absorber, the required installation space is unnecessarily increased. In addition, when the coil spring is rotated by a motor, the upper contact end and the lower contact end of the coil spring may be worn, and a coating layer formed thereon may be peeled off by friction. In addition, a portion of the coil spring that is worn or from which a coating layer has been peeled off may be corroded, and the spring may be fractured in severe cases.

DISCLOSURE

Technical Problem

The present invention has been made in view of the above problems, and it is an object of the present invention to provide an active suspension system capable of adjusting a force acting axis of a spring, in which a spring force acting axis adjustment device is mounted to one or both of an upper seat plate and a lower seat plate, which are, respectively, mounted to the upper contact end and the lower contact end of a coil spring at the exterior of a shock absorber in the suspension system, in order to easily vary a force acting axis of the coil spring depending on the state of the road on which the vehicle is to travel, thereby freely adjusting a wheel rate and a height of the vehicle, minimizing a space between the bottom surface of a chassis and the top surface of a lower arm, improving convenience in designing the chassis and the suspension system, reducing manufacturing costs, minimizing damage to a coating layer and abrasion attributable to friction between the upper and lower ends of the coil spring and the seat plates, and greatly increasing the lifespan of the coil spring and the seat plates.

Technical Solution

The object of the present invention can be accomplished by the provision of an active suspension system capable of adjusting a force acting axis of a spring, in which one end portion of an upper arm is pivotably supported by a chassis and the opposite end portion thereof is pivotably supported by an upper portion of a wheel via an upper ball joint, one end portion of a lower arm is pivotably supported by the chassis and the opposite end portion thereof is pivotably supported by a lower portion of the wheel via a lower ball joint, a shock absorber and a coil spring are mounted between a bottom surface of the chassis and a top surface of the lower arm, an upper seat plate and a lower seat plate, each having a circular plate shape, are respectively mounted to an upper contact end and a lower contact end of the coil spring at the exterior of the shock absorber, a spring force acting axis adjustment device is mounted between the upper seat plate and the upper arm or between the lower seat plate and the lower arm in order to allow a wheel rate and a height of a vehicle to be adjusted by varying a force acting axis of the coil spring, and a manipulation unit for controlling operation of the spring force acting axis adjustment device is arranged inside the vehicle.

The spring force acting axis adjustment device may be mounted in each of the region between the upper seat plate and the upper arm and the region between the lower seat plate and the lower arm.

The spring force acting axis adjustment device may include a pair of seat rotation support shafts protruding straight from two opposite points on an outer surface of the upper seat plate or the lower seat plate in order to allow the upper seat plate or the lower seat plate to be rotatably supported by the upper arm or the lower arm, a servomotor fixedly mounted to the upper arm or the lower arm and configured to rotate in a forward direction or in a reverse direction in response to an output signal of the manipulation unit and to generate torque required to adjust the force acting axis of the coil spring, a worm gear fixedly mounted to a rotary shaft of the servomotor and configured to transmit torque of the servomotor that is generated in the forward direction or in the reverse direction to the upper seat plate or the lower seat plate via a worm wheel, and a worm wheel fixedly mounted to one of the pair of seat rotation support shafts provided at the upper seat plate or the lower seat plate, the worm wheel meshing with the worm gear while being oriented perpendicularly to the worm gear in order to reduce torque transmitted via the worm gear and to transmit the reduced torque to the upper seat plate or the lower seat plate via the one of the pair of seat rotation support shafts so that the upper seat plate or the lower seat plate is inclined depending on a rotational direction and the number of revolutions per minute of the servomotor and so that the force acting axis of the coil spring is varied.

Advantageous Effects

As described above, according to the active suspension system capable of adjusting a force acting axis of a spring of the present invention, a spring force acting axis adjustment device is mounted to one or both of an upper seat plate and a lower seat plate, which are, respectively, mounted to the upper contact end and the lower contact end of a coil spring at the exterior of a shock absorber in the suspension system, in order to easily vary a force acting axis of the coil spring depending on the state of the road on which the vehicle is to travel, thereby freely adjusting a wheel rate and a height of the vehicle, minimizing a space between the bottom surface of a chassis and the top surface of a lower arm, improving convenience in designing the chassis and the suspension system, reducing manufacturing costs, minimizing damage to a coating layer and abrasion attributable to friction between the upper and lower ends of the coil spring and the seat plates, greatly increasing the lifespan of the coil spring and the seat plates, and remarkably enhancing reliability and marketability of the suspension system via variation in the force acting axis of the coil spring and consequent improvement of the riding comfort of the vehicle.

BEST MODE

Hereinafter, exemplary embodiments of the present invention will be described in detail with reference to the accompanying drawings.

In the following description of the embodiments, a detailed description of known functions and configurations incorporated herein will be omitted when it may obscure the subject matter of the present invention.

Figure 1:
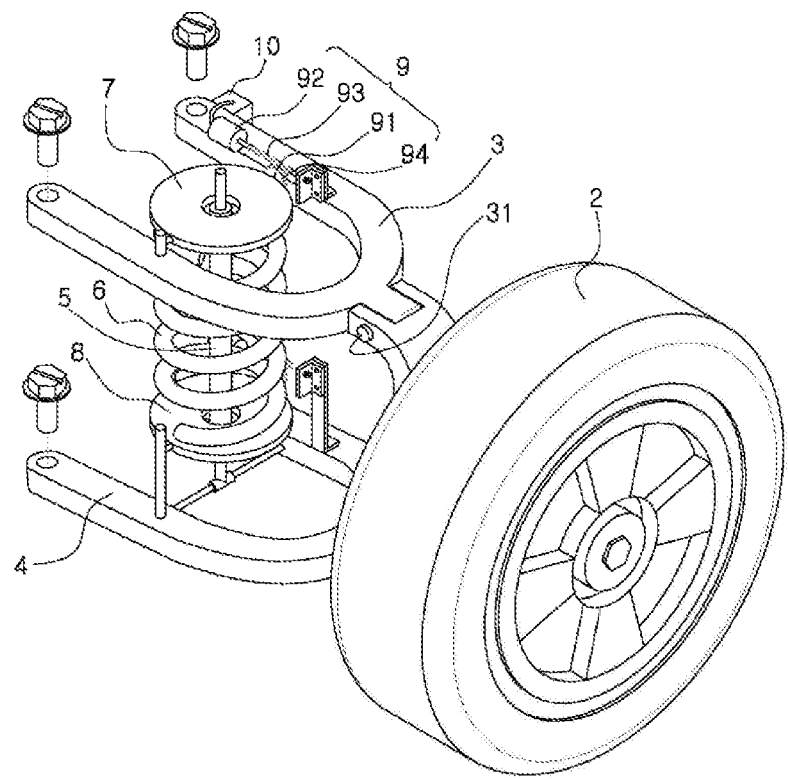
FIG. 1 illustrates a partial perspective view of an embodiment of an active suspension system according to the present invention.
Figure 2:
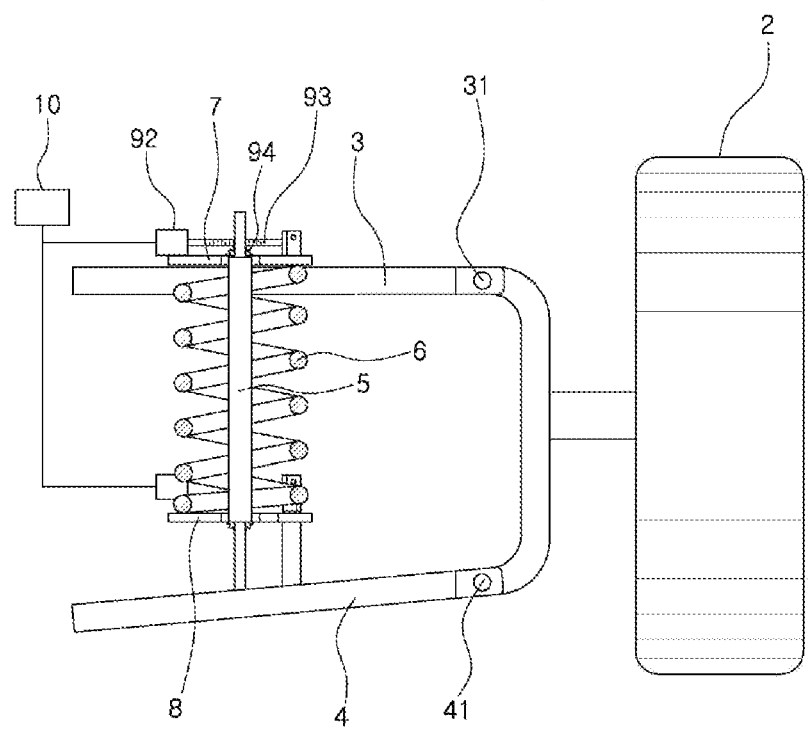
FIG. 2 illustrates a front view of the embodiment of the active suspension system according to the present invention.
Figure 3:
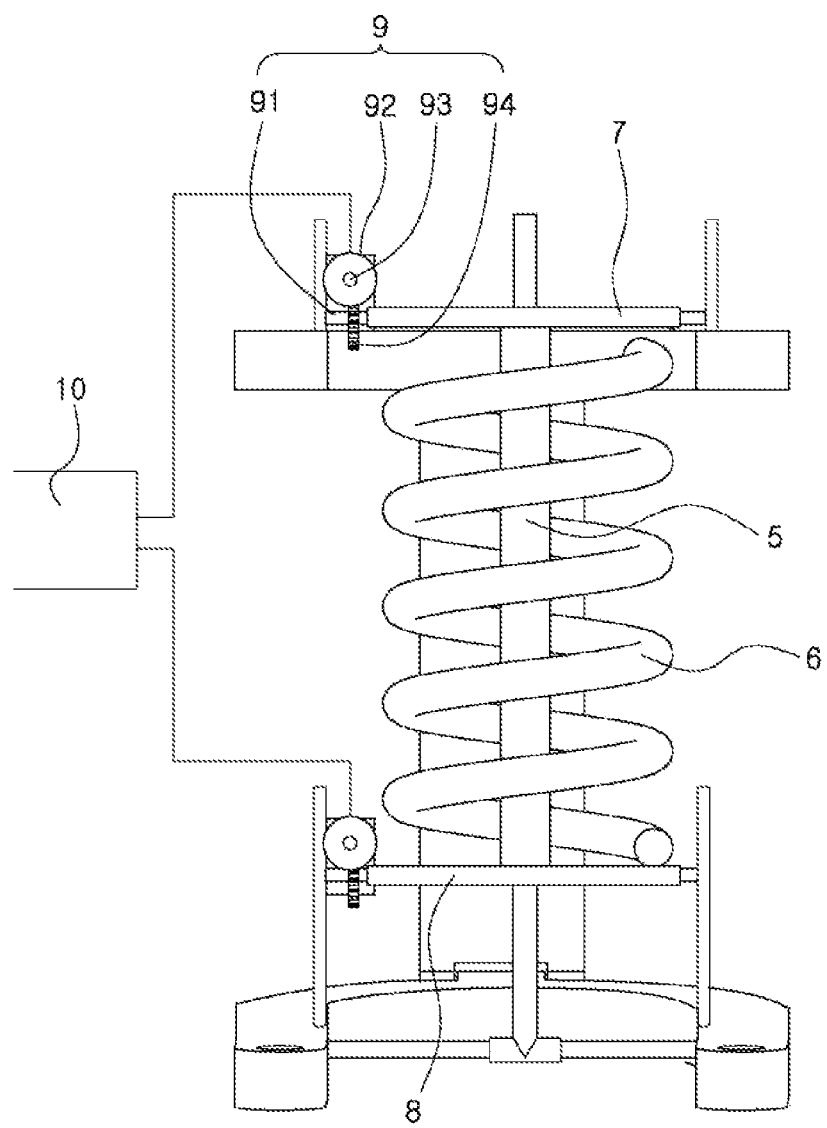
FIG. 3 illustrates a side view of the embodiment of the active suspension system according to the present invention.

FIG. 1 illustrates a partial perspective view of an embodiment of an active suspension system according to the present invention, FIG. 2 illustrates a front view of the embodiment of the active suspension system according to the present invention, and FIG. 3 illustrates a side view of the embodiment of the active suspension system according to the present invention.

Figure 4:
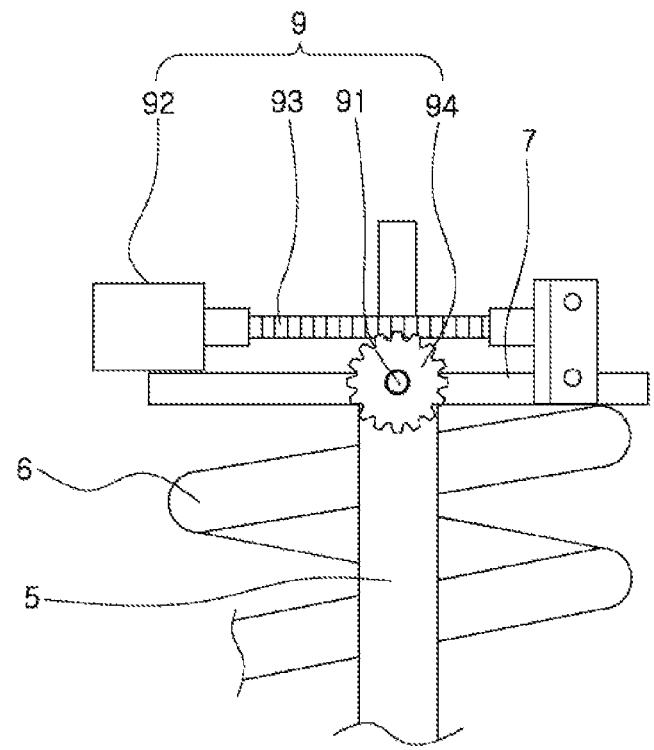
FIG. 4 illustrates a partially enlarged view for explaining the coupling state of a spring force acting axis adjustment device of the embodiment of the active suspension system according to the present invention.
Figure 5:
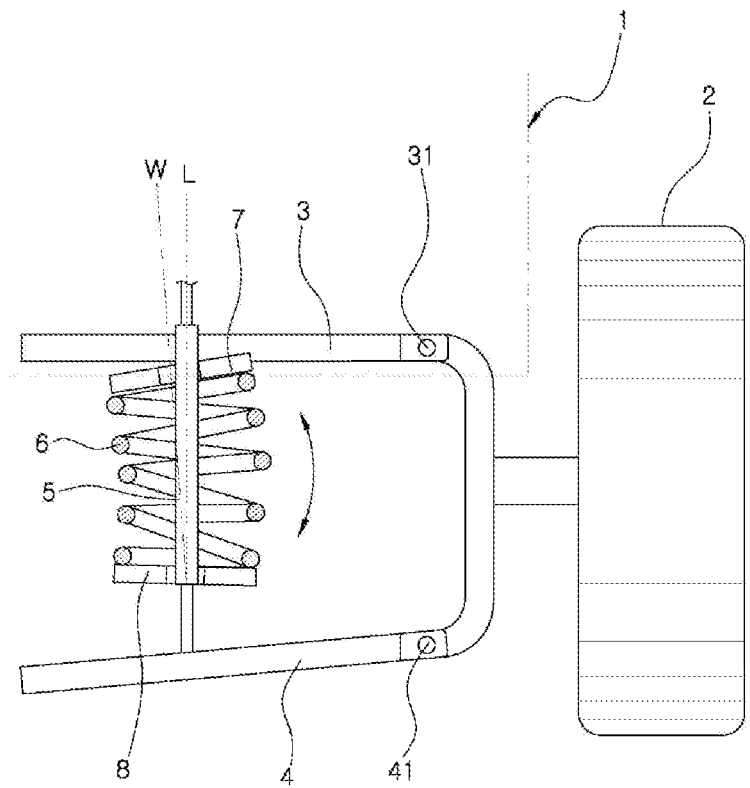
FIGS. 5 and 6 illustrate schematic front views for explaining the state of varying a force acting axis of a coil spring using the spring force acting axis adjustment device of the embodiment of the present invention.
Figure 6:
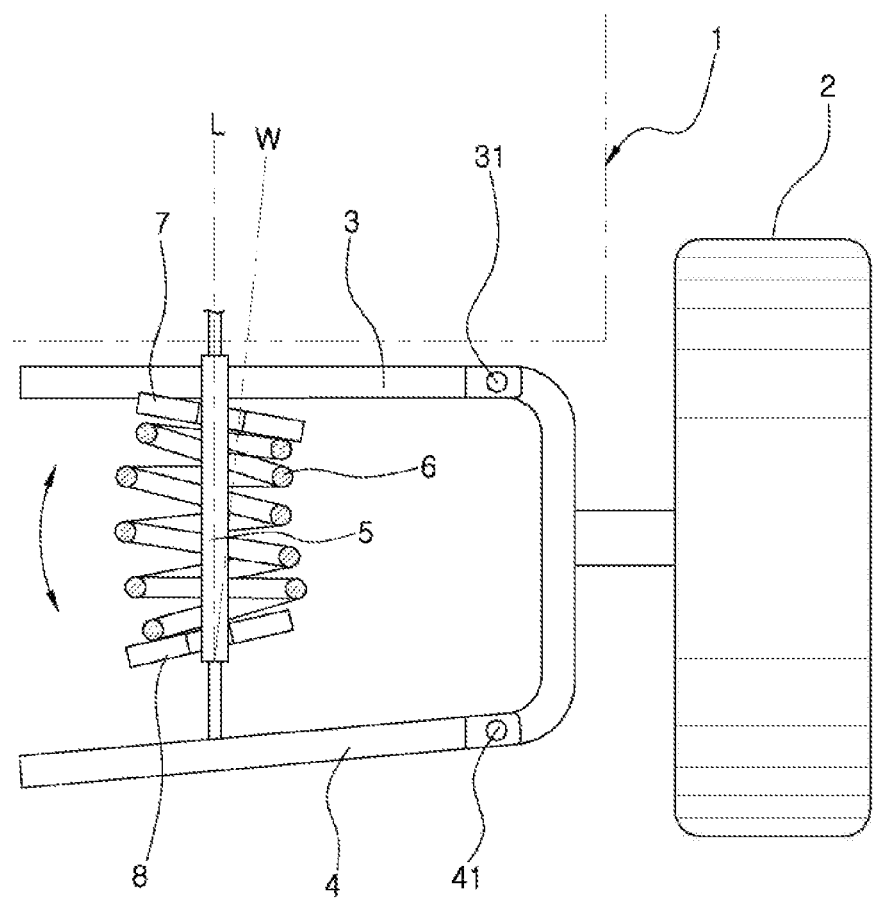

FIG. 4 illustrates a partially enlarged view for explaining the coupling state of a spring force acting axis adjustment device of the embodiment of the active suspension system according to the present invention, and FIGS. 5 and 6 illustrate schematic front views for explaining the state of varying a force acting axis of a coil spring using the spring force acting axis adjustment device of the embodiment of the present invention.

A suspension system of a vehicle embodied according to the present invention is characterized in that:

one end portion of an upper arm 3 is pivotably supported by a chassis 1 and the opposite end portion thereof is pivotably supported by the upper portion of the wheel 2 via an upper ball joint 31, one end portion of a lower arm 4 is pivotably supported by the chassis 1 and the opposite end portion thereof is pivotably supported by the lower portion of the wheel 2 via a lower ball joint 41, a shock absorber 5 and a coil spring 6 are mounted between the bottom surface of the chassis 1 and the top surface of the lower arm 4, and an upper seat plate 7 and a lower seat plate 8, each having a circular plate shape, are respectively mounted to the upper contact end and the lower contact end of the coil spring 6 at the exterior of the shock absorber 5, wherein a spring force acting axis adjustment device 9 is mounted in one of a region between the upper seat plate 7 and the upper arm 3 and a region between the lower seat plate 8 and the lower arm 4 in order to adjust a wheel rate and a height of the vehicle by varying a force acting axis W of the coil spring 6, and wherein a manipulation unit 10 for controlling the operation of the spring force acting axis adjustment device 9 is mounted inside the vehicle.

Alternatively, the spring force acting axis adjustment device 9 is mounted in each of the region between the upper seat plate 7 and the upper arm 3 and the region between the lower seat plate 8 and the lower arm 4.

The spring force acting axis adjustment device 9 includes:

a pair of seat rotation support shafts 91, which protrude straight from two opposite points on the outer surface of the upper seat plate 7 or the lower seat plate 8 in order to allow the upper seat plate 7 or the lower seat plate 8 to be rotatably supported by the upper arm 3 or the lower arm 4;

a servomotor 92, which is fixedly mounted to the upper arm 3 or the lower arm 4 and is configured to rotate in the forward direction or in the reverse direction in response to an output signal of the manipulation unit 10 and to generate torque required to adjust the force acting axis W of the coil spring 6;

a worm gear 93, which is fixedly mounted to a rotary shaft 95 of the servomotor 92 and serves to transmit the torque of the servomotor 92, which is generated in the forward direction or in the reverse direction, to the upper seat plate 7 or the lower seat plate 8 via a worm wheel 94; and a worm wheel 94, which is fixedly mounted to one of the pair of seat rotation support shafts 91 provided at the upper seat plate 7 or the lower seat plate 8 and meshes with the worm gear 93 while being oriented perpendicularly to the worm gear 93 in order to reduce the torque transmitted from the servomotor 92 via the worm gear 93 and to transmit the reduced torque to the upper seat plate 7 or the lower seat plate 8 via the one of the pair of seat rotation support shafts so that the upper seat plate 7 or the lower seat plate 8 is inclined depending on the rotational direction and the number of revolutions per minute (RPM) of the servomotor 92 and so that the force acting axis W of the coil spring 6 is varied.

The operational effect of the active suspension system capable of adjusting a force acting axis of a spring of the present invention configured as described above will now be described.

First, as shown in FIGS. 1 to 4, the active suspension system capable of adjusting a force acting axis of a spring of the present invention, which includes the components of the known suspension system, that is, the upper arm 3, the lower arm 4, the shock absorber 5 and the coil spring 6, is characterized in that the spring force acting axis adjustment device 9 is mounted in one of the region between the upper seat plate 7 and the upper arm 3 and the region between the lower seat plate 8 and the lower arm 4 in order to enable a driver to vary the force acting axis W of the coil spring 6 via appropriate operation of the spring force acting axis adjustment device 9 depending on the state of the road on which the vehicle is to travel, thereby freely adjusting a wheel rate and a height of the vehicle.

Here, among the components of the known suspension system, the upper arm 3 is configured such that one end portion thereof is pivotably supported by the chassis 1 and the opposite end portion thereof is pivotably supported by the upper portion of the wheel 2 via the upper ball joint 31.

In addition, the lower arm 4 is configured such that one end portion thereof is pivotably supported by the chassis 1 and the opposite end portion thereof is pivotably supported by the lower portion of the wheel 2 via the lower ball joint 41.

In addition, the shock absorber 5 and the coil spring 6 are mounted between the bottom surface of the chassis 1 and the top surface of the lower arm 4, and the upper seat plate 7 and the lower seat plate 8, each having a circular plate shape, are respectively mounted to the upper contact end and the lower contact end of the coil spring 6 at the exterior of the shock absorber 5.

In addition, as described above, the present invention is configured such that the spring force acting axis adjustment device 9 is mounted in one of the region between the upper seat plate 7 and the upper arm 3 and the region between the lower seat plate 8 and the lower arm 4 and such that the manipulation unit 10 for controlling the operation of the spring force acting axis adjustment device 9 is mounted in the vehicle so as to enable a driver to adjust the inclination angle of the upper seat plate 7 or the lower seat plate 8 and to vary the force acting axis W of the coil spring 6 to a certain angle suitable for the state of the road, thereby adjusting a wheel rate and a height of the vehicle.

Alternatively, the present invention is configured such that the spring force acting axis adjustment device 9 is mounted in each of the region between the upper seat plate 7 and the upper arm 3 and the region between the lower seat plate 8 and the lower arm 4 so that the driver can adjust the inclination angle of the upper seat plate 7 and the inclination angle of the lower seat plate 8 at the same time appropriately for the state of the road and can vary the force acting axis W of the coil spring 6 to a certain angle, thereby accurately adjusting a wheel rate and a height of the vehicle to driver's desired levels.

Here, the spring force acting axis adjustment device 9 according to the present invention includes the pair of seat rotation support shafts 91, the servomotor 92, the worm gear, and the worm wheel 94.

Among the components of the spring force acting axis adjustment device 9, the pair of seat rotation support shafts 91 protrudes straight from two opposite points on the outer surface of the upper seat plate 7 or the lower seat plate 8 such that the distal ends thereof are pivotably supported by the upper arm 3 or the lower arm 4, thereby enabling the upper seat plate 7 or the lower seat plate 8 to rotate with respect to the upper arm 3 or the lower arm 4.

In addition, the servomotor 92 is configured to be driven in the forward direction or in the reverse direction depending on the direction in which direct current voltage is supplied. The servomotor 92 is fixedly mounted to a portion of the upper arm 3 or the lower arm 4, is driven in the forward direction or in the reverse direction in response to an output signal of the manipulation unit 10, and serves to generate torque required to adjust the force acting axis W of the coil spring 6 via adjustment of the inclination angle of the upper seat plate 7 or the lower seat plate 8.

In addition, the worm gear 93 is formed such that gear teeth having a substantially screw-like shape are integrally formed on the outer circumferential surface of a rod. The worm gear 93 is fixedly mounted to the rotary shaft 95 of the servomotor 92, meshes with the worm wheel 94 while being oriented perpendicularly to the worm wheel 94, and serves to rotate in the direction corresponding to the rotational direction of the servomotor 92, which is rotated in the forward direction or in the reverse direction, and to transmit the torque generated from the servomotor 92 to the upper seat plate 7 or the lower seat plate 8 via the worm wheel 94.

In addition, the worm wheel 94 is fixedly mounted to one of the pair of seat rotation support shafts 91 provided at the upper seat plate 7 or the lower seat plate 8, and meshes with the worm gear 93 while being oriented perpendicularly to the worm gear 93.

The worm wheel 94 reduces the torque, transmitted from the servomotor 92 via the worm gear 93, in accordance with a gear ratio, and transmits the reduced torque to the upper seat plate 7 or the lower seat plate 8 via the seat rotation support shaft 61, which rotates together with the worm wheel 94. For example, the upper seat plate 7 or the lower seat plate 8, which is maintained in the state shown in FIG. 2, rotates about the seat rotation support shaft 61 depending on the rotational direction and the RPM of the servomotor 92, and is inclined as illustrated in FIGS. 5 and 6.

Therefore, the compressed state of the coil spring 6 is varied, and the center position of the load applied through the coil spring 6 is shifted from the center line L toward the chassis (refer to FIG. 5) or away from the chassis (refer to FIG. 6). Therefore, the distance between the force acting axis W of the coil spring 6 and the contact point with the chassis 1 is varied, and consequently the height of the vehicle and the riding comfort of the vehicle are varied.

At this time, as shown in FIG. 4, since the screw-type worm gear 93, which is mounted to the rotary shaft 95 of the servomotor 92, and the worm wheel 94, which is fixedly mounted to one of the pair of seat rotation support shafts 91 provided at the upper seat plate 7 or the lower seat plate 8, mesh with each other while being oriented perpendicularly to each other, the worm wheel 94 is maintained in the present state thereof without being rotated even when the restoring force of the coil spring 6, the force acting axis of which is inclined toward the chassis or the wheel (that is, the center axis of the coil spring 6 to which a load is applied is shifted in the inward direction or in the outward direction), is applied to the worm wheel or even when strong external shocks are transmitted to the worm wheel via the wheel.

That is, due to the engagement of the worm wheel 94 and the worm gear 93 in the directions perpendicular to each other, the worm wheel 94 is rotated only by the rotation of the worm gear 93, and the worm gear 93 is rotated only by the servomotor 92. Therefore, the worm wheel 94 is prevented from rotating even when external pressure or shocks are applied thereto.

Therefore, as described above, once a driver adjusts a wheel rate and a height of the vehicle by varying the force acting axis W of the coil spring 6 to a certain angle via the spring force acting axis adjustment device 9 so as to cope with the state of the road, regardless of the type of road on which the vehicle travels, the force acting axis W of the coil spring 6 is not varied but is maintained in the previously adjusted state due to the engagement of the worm gear 93 and the worm wheel 94 in the directions perpendicular to each other.

Although not illustrated in the drawings, it is desirable to additionally mount a vehicle height detection sensor to the chassis. When the wheel rate of the vehicle is adjusted by varying the force acting axis W of the coil spring 6 to a certain angle via the spring force acting axis adjustment device 9, the vehicle height detection sensor may detect the height of the vehicle automatically so that whether the height of the vehicle has reached a driver's desired height is determined, thereby accurately controlling the inclination angle of the upper seat plate 7 or the lower seat plate 8.

When the suspension system is operated such that the force acting axis W of the coil spring 6 is shifted toward the chassis (that is, in the inward direction), as shown in FIG. 5, using the spring force acting axis adjustment device 9, the height of the vehicle is lowered so as to be suitable for a road having a good road surface condition, such as a paved road or the like. Conversely, when the force acting axis W of the coil spring 6 is shifted toward the wheel (that is, in the outward direction), as shown in FIG. 6, the height of the vehicle is raised so as to be suitable for a road having a bad road surface condition, such as an unpaved road or the like.

Therefore, a driver checks the state of the road before driving the vehicle and operates the spring force acting axis adjustment device 9 using the manipulation unit 10 in order to vary the force acting axis W of the coil spring 6 to a desired angle, thereby freely controlling the wheel rate and the height of the vehicle.

As described above, the force acting axis W of the coil spring 6 is adjusted by adjusting the angle of the upper seat plate 7 or the lower seat plate 8, which is mounted between the upper contact end and the lower contact end of the coil spring 6 at the upper and lower regions in the exterior of the shock absorber 5, using the spring force acting axis adjustment device 9, and consequently the wheel rate and the height of vehicle are adjusted. Therefore, a space between the bottom surface of the chassis and the top surface of the lower arm is minimized, thereby improving convenience in designing the chassis and the suspension system and reducing manufacturing costs.

In addition, since no friction occurs between the upper and lower ends of the coil spring 6 and the seat plates during the adjustment of the force acting axis W of the coil spring 6, damage to a coating layer and abrasion are minimized, the lifespan of the coil spring and the seat plates are greatly increased, and reliability and marketability of the suspension system are remarkably enhanced via variation in the force acting axis of the coil spring and consequent improvement of the riding comfort of the vehicle.

While the present invention has been particularly described with reference to exemplary embodiments, the present invention is not limited thereto, and it will be apparent to those skilled in the art that various modifications and applications may be made without departing from the spirit and scope of the present invention as defined in the following claims.

INDUSTRIAL APPLICABILITY

The present invention relates to an active suspension system capable of adjusting a force acting axis of a spring, which is characterized in that a spring force acting axis adjustment device is mounted in one of a region between an upper seat plate and an upper arm and a region between a lower seat plate and a lower arm in order to adjust a wheel rate and a height of a vehicle by varying a force acting axis of a coil spring and in that a manipulation unit for controlling the operation of the spring force acting axis adjustment device is mounted in the vehicle. It is possible to remarkably enhance reliability and marketability of the suspension system via variation in the force acting axis of the coil spring and consequent improvement of the riding comfort of the vehicle.

The invention claimed is:

1. An active suspension system capable of adjusting a force acting axis of a spring, the suspension system comprising:
    an upper arm, wherein one end portion of the upper arm is pivotably supported by the chassis and an opposite end portion thereof is pivotably supported by an upper portion of a wheel via an upper ball joint;
    a lower arm, wherein one end portion of the lower arm is pivotably supported by the chassis and an opposite end portion thereof is pivotably supported by a lower portion of the wheel via a lower ball joint;
    an upper seat plate, wherein a slant angle of the upper seat plate is adjustable as the upper seat plate is rotated around a rotation axis extending along a front-rear direction of a vehicle;
    a lower seat plate, wherein a slant angle of the lower seat plate is adjustable as the lower seat plate is rotated around a rotation axis extending along the front-rear direction;
    a coil spring, wherein an upper portion of the spring is seated on the upper seat plate, a lower portion of the spring is seated on the lower seat plate, the spring can be seated between the upper and lower seat plates with at least a portion thereof bent in a C-shape, a location of the force acting axis of the spring is changed between a first location and a second location, the first location is located at a chassis side and the second location is located at a wheel side with respect to a virtual vertical center line connected between the upper and lower portion of the spring, and the location of the force acting axis of the spring is changed by the spring being bent such that an expansion portion of the bent spring faces the wheel with a wide portion of the angled upper and lower seat plates arranged toward the wheel and bent such that an expansion portion of the bent spring faces an opposite direction to the wheel with a wide portion of the angled upper and lower seat plates arranged toward the opposite direction to the wheel;
    a spring force acting axis adjustment device, wherein the device is mounted between the upper arm and the upper seat plate or between the lower arm and the lower seat plate, and the device is configured to rotate the upper seat plate and the lower seat plate in respective opposite directions so as to make the wide portion of the angled upper and lower seat plates arranged toward the wheel or the opposite direction to the wheel; and
    a manipulation unit for controlling operation of the spring force acting axis adjustment device,
    wherein the spring force acting axis adjustment device comprises,
    a pair of seat rotation support shafts protruding straight from two opposite points on an outer surface of the upper seat plate or the lower seat plate in order to allow the upper seat plate or the lower seat plate to be rotatably supported by the upper arm or the lower arm,
    a servomotor fixedly mounted to the upper arm or the lower arm with a rotary shaft thereof arranged along a right-and-left direction of the vehicle and configured to generate driving torque by being rotated in a forward direction or in a reverse direction in response to an output signal of the manipulation unit,
    a worm gear fixedly mounted to the rotary shaft of the servomotor to be rotated in the forward direction or in the reverse direction, and
    a worm wheel fixedly mounted to one of the pair of seat rotation support shafts with a rotational axis thereof arranged along the front-rear direction, wherein the worm wheel meshes with the worm gear whit an orientation perpendicularly to the worm gear in order to reduce torque transmitted via the worm gear and transmit the reduced torque to the upper seat plate or the lower seat plate via the one of the pair of seat rotation support shafts so that the upper seat plate or the lower seat plate is inclined depending on a rotational direction and the number of revolutions of the servomotor and so that the force acting axis of the coil spring is varied.

2. The active suspension system according to claim 1, the spring force acting axis adjustment device comprising,
    an upper adjustment device for rotating the upper seat plate, and
    a lower adjustment device for rotating the lower seat plate.

* * * * *